(No Model.)
G. C. BOVEY.
TWO WHEELED VEHICLE.
No. 353,620. Patented Nov. 30, 1886.
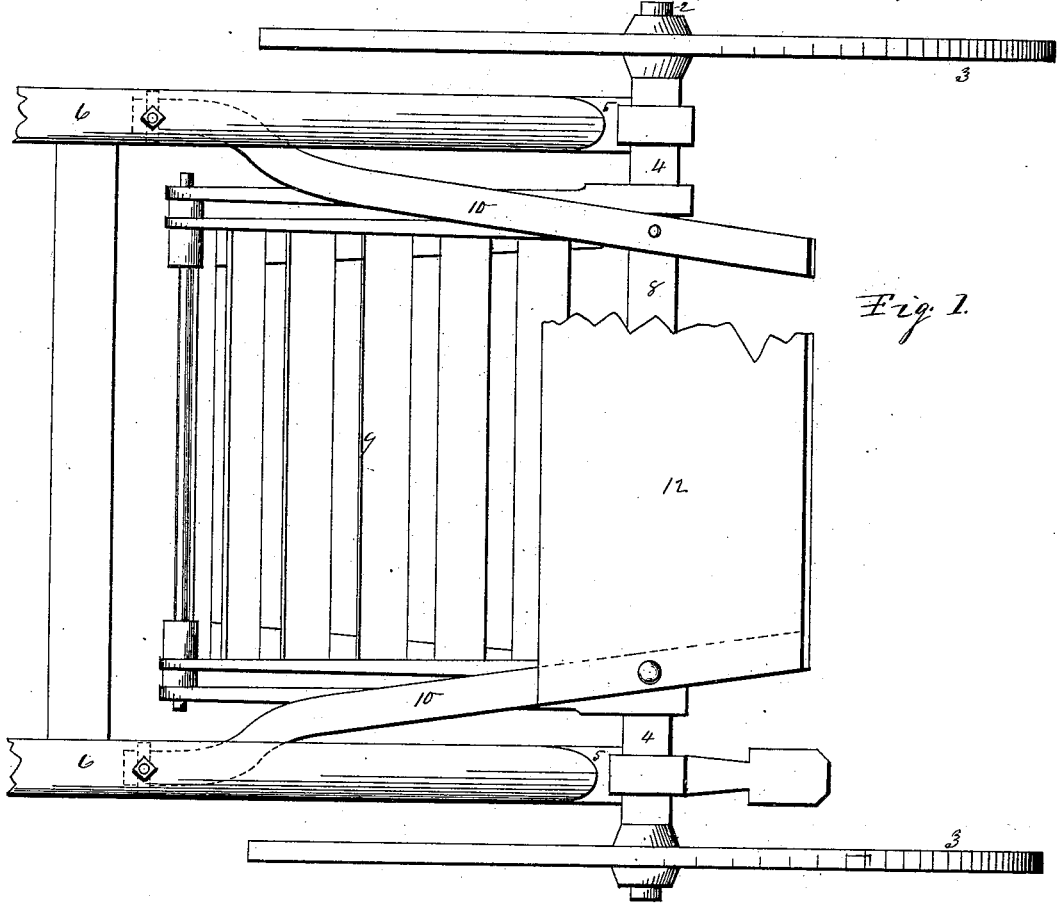
Fig. 1.
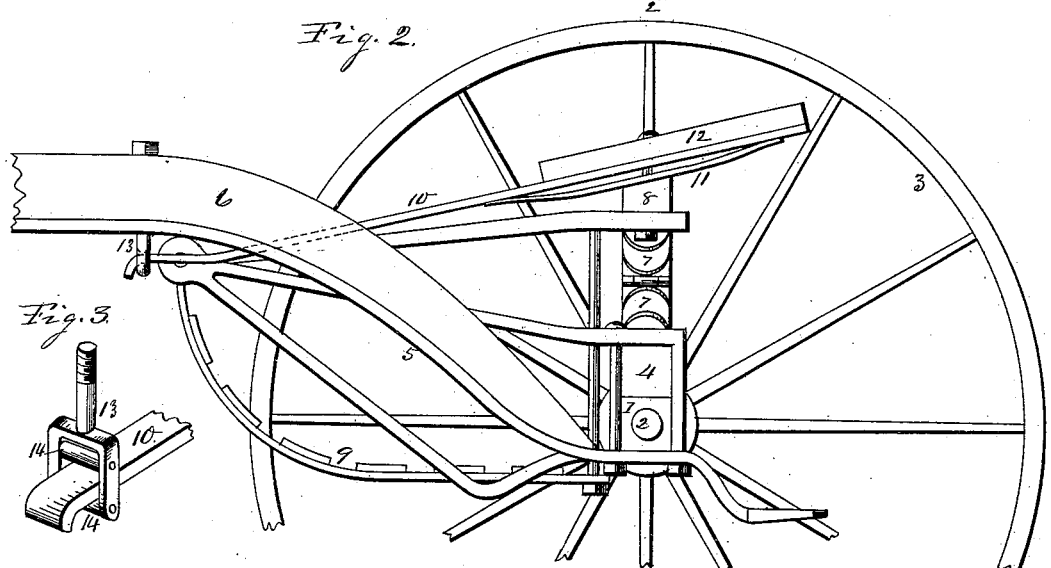
Fig. 2.
Fig. 3.

UNITED STATES PATENT OFFICE.

GEORGE C. BOVEY, OF MOUNT MORRIS, ILLINOIS.

TWO-WHEELED VEHICLE.

SPECIFICATION forming part of Letters Patent No. 353,620, dated November 30, 1886.

Application filed September 20, 1886. Serial No. 214,069. (No model.)

*To all whom it may concern:*

Be it known that I, GEORGE C. BOVEY, a citizen of the United States, residing at Mount Morris, in the county of Ogle and State of Illinois, have invented a new and useful Improvement in Vehicles, of which the following is a specification.

This invention relates to a class of vehicles known in the trade as the "road-cart," but more particularly as the "sulky road-cart," and is an improvement on the cart of a prior application on which a patent was allowed me July 3, 1886.

The object of this invention is to lessen what is known as the "horse motion," common to this class of vehicles; and it consists, essentially, in side-spring supports to the seat and in their combination with parts of the vehicle, all of which will hereinafter appear.

In the accompanying drawings, Figure 1 is a plan view of a vehicle embodying my invention. Fig. 2 is a side elevation with one of the carrying-wheels omitted, and Fig. 3 is an isometrical representation of the connection of the side springs with the thills.

In the figures, the several parts, consisting of the axle-tree 1, axle arms 2, carrying-wheels 3, wood backing 4 on the upper face of the axletree, thill-irons 5, thills 6, elliptic spring 7, and transverse spring-bar 8, their construction, application, and their connection with each other, also the foot-basket 9, its construction and its connections with the several parts of the vehicle, are in every essential feature substantially identical with like parts of the vehicle forming the subject-matter of my former application, hereinbefore referred to, and I do not deem it necessary to give a more detailed description of these several parts in this application.

The side-spring supports to the seat consist of a main supporting-leaf, 10, and an auxiliary curved under leaf, 11. The under curved leaf, 11, is of the usual spring form, and is placed with its central portion on the end portion of the transverse spring-bar 8. The main supporting-leaf, 10, of the spring is of bar form, and its end rear portion is placed on the curved leaf 11. The seat 12, a portion of which is shown, is placed on the rear end portion of the side springs, and with the spring is held in place on the transverse spring-bar by a screw-bolt passed through the parts.

The forward ends of the main supporting-leaf 10 of the side springs are curved to pass to the under side of the thills, at which point they are received in a loop, 13, depending from the thills, forming a free connection of their forward ends therewith, to permit an endwise movement of the leaf in its loop-connection. This free connection of the side springs with the thills permits the thills to vibrate independently of the seat, and consequently relieves it from the vibratory movement of the thills produced by the movement of the horse.

In the connection of the forward end of the side springs with the thills, in this instance, I have employed anti-friction rollers 14, between which the forward end of the side spring is passed to reduce the friction in its endwise movements; but instead of the rollers, a simple loop or other equivalent device may be employed to produce a free connection.

I claim as my invention—

1. In a road-cart, the transverse combination, with the thills and with the spring-bar, of a seat-supporting side spring having a free connection of its forward end with the thills, and its rear end portion supported on the transverse spring-bar, substantially as and for the purpose set forth.

2. In a road-cart, the combination, with the spring-bar and with the side-spring support to the seat having a free connection of its forward end with the thills, of an auxiliary spring between the spring-bar and the side spring support to the seat, substantially as and for the purpose set forth.

3. The combination, with the side-spring support to the seat and with the thills, of an anti-friction-roller support of the forward end of the side-spring support, substantially as and for the purpose set forth.

GEORGE C. BOVEY.

Witnesses:
  MARTIN ZELLERS,
  JAMES H. AKING.

It is hereby certified that in Letters Patent No. 353,620, granted November 30, 1886, upon the application of George C. Bovey, of Mount Morris, Illinois, for an improvement in "Two-Wheeled Vehicles," an error appears in the printed specification requiring the following correction: In line 75 the word "transverse" should be stricken out and inserted before the word "spring-bar" in line 76; and that the said Letters Patent should be read with this correction therein that the same may conform to the record of the case in the Patent Office.

Signed, countersigned, and sealed this 21st day of December, A. D. 1886.

[SEAL.]

D. L. HAWKINS,
*Acting Secretary of the Interior.*

Countersigned:
    R. B. VANCE,
        *Acting Commissioner of Patents.*